Dec. 20, 1927.

C. M. EBEL 1,653,156

AXLE ARRANGEMENT

Filed May 29, 1926

INVENTOR.
Charles M. Ebel

BY

ATTORNEY.

Dec. 20, 1927.

C. M. EBEL 1,653,156

AXLE ARRANGEMENT

Filed May 29, 1926

INVENTOR.
Charles M. Ebel.

BY

ATTORNEY.

Patented Dec. 20, 1927.

1,653,156

UNITED STATES PATENT OFFICE.

CHARLES M. EBEL, OF WINDSOR, ONTARIO, CANADA.

AXLE ARRANGEMENT.

Application filed May 29, 1926. Serial No. 112,458.

This invention aims to provide an axle arrangement wherein a distributing member is pivotally mounted on each end of the carrying axle and substantially at right angles thereto, so that two wheels, one ahead of and one behind the carrying axle, can be utilized on each side of the vehicle. This pivotal arrangement of the distributing member reduces the rise and fall of the axle to half the distance that any one of the wheels rises or falls, and consequently the wear and tear on the vehicle is materially lessened.

Another object of the invention is to provide an axle arrangement wherein the driving axle is supported by the carrying axle and has sprockets on both its ends from which all the wheels on the distributing member are driven. So that should either or both leading wheels sink into a soft spot in the road the trailing wheels will continue to move the vehicle forward, or vice versa.

A further object of the invention is to provide an axle arrangement which can easily be applied to existing vehicles without necessitating any great constructional changes. Moreover the arrangement may advantageously be employed for wheels with caterpillar chains.

With these and other objects in view, which will become apparent as the specification proceeds, an embodiment of the invention is hereinafter described with the aid of the accompanying drawings in which.

Figure 1:
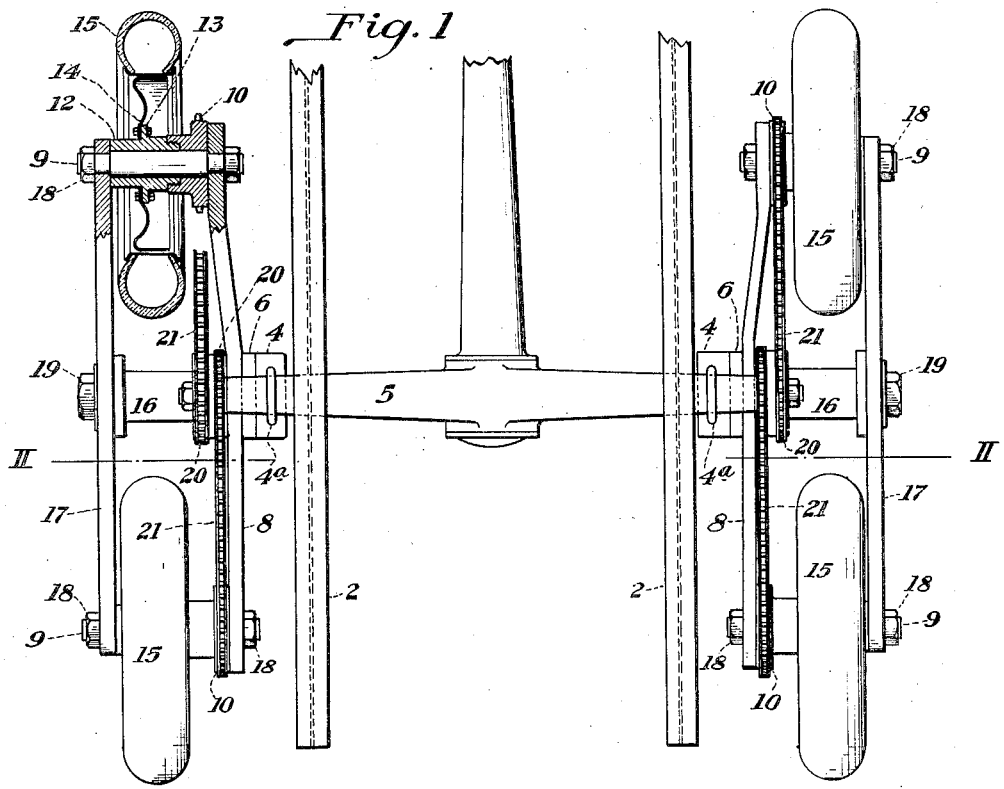
Figure 1 is a plan view of the invention.
Figure 2:
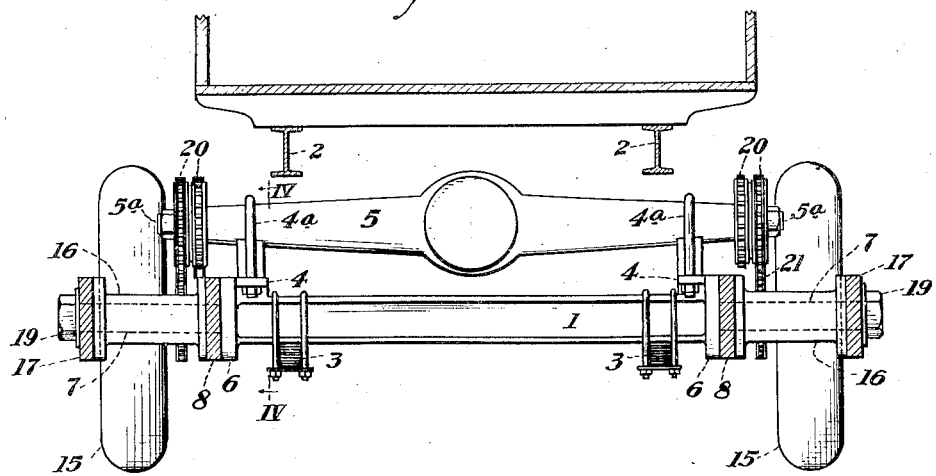
Fig 2 is a section on the line II—II of Figure 1.

Referring more particularly to the drawings, 1 designates a carrying axle of any desired cross section from which the frame 2 is supported by springs 3. On each side of the carrying axle and preferably integral with it blocks 4 are arranged which support the driving axle housing 5. The latter is usually held in position by means of U-bolts 4ª. The ends of the carrying axles terminate in flanges 6 from which extensions 7 project outwardly. On the extensions 7, and in contact with the outer surfaces of the flanges 6, distributing members 8 are arranged which extend both forwardly and rearwardly. Towards the extremities of these members axle pins 9 are secured which extend outwardly, and on them sprocket wheels 10 are revolvably mounted. Around the axle pins sleeves 12 are secured, and to the flanges 13 integral with the sleeves 12 the hubs 14 of the wheels 15 are fastened. Around the extensions 7 annular distance pieces 16 are arranged, and tie rods 17, extending between the front and rear axle pins 9, are mounted intermediately of their length on the outer ends of said extensions. Nuts 18 and 19 are usually threaded on the outer ends of said extensions and axle pins respectively to hold the tie rods in position.

On both ends of the driving axle 5ª sprockets 20 are secured which drive the sprocket wheels 10. It will be noted in the drawings that the forwardly extending portions of the distributing members are outwardly inclined whereas the rearwardly extending portions of the distributing members are substantially at right angles to the carrying axle, this is done so that the forward and rear sprockets 10 will be in line with their respective driving sprockets 20, though obviously other means may be employed for accomplishing the same purpose. 21 indicates the driving chains.

Figure 5:
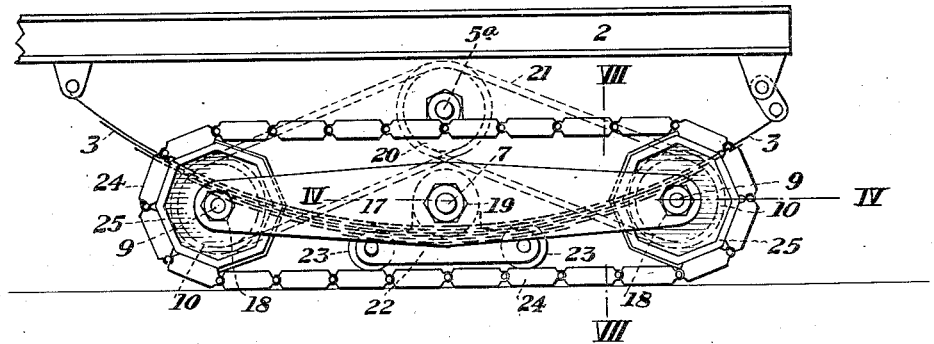
Figure 5 illustrates the invention equipped with caterpillar wheels and chains.
Figure 3:
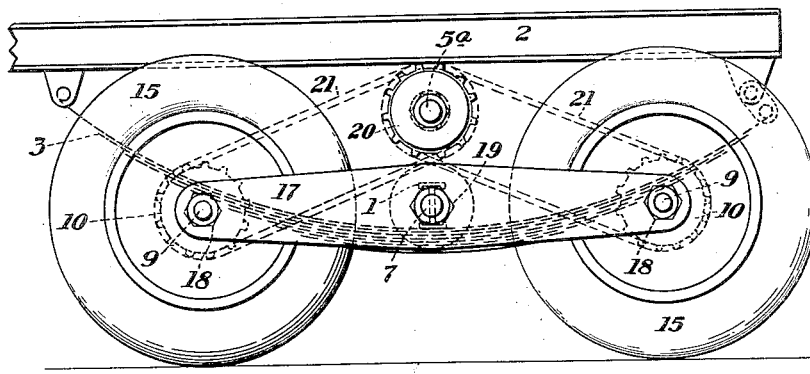
Figure 3 is a side elevation.
Figure 7:
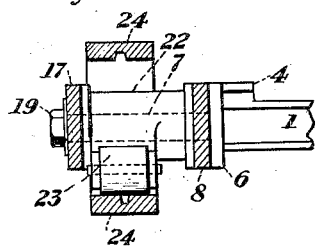
Figure 7 is a section on the line VII—VII of Figure 5.
Figure 4:
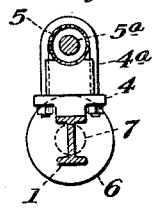
Figure 4 is a section on the line IV—IV of Figure 2.
Figure 6:
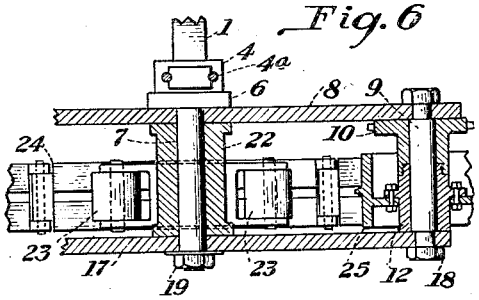
Figure 6 is a section on the line VI—VI of Figure 5.

Figures 5, 6, and 7 refer to a flexible chain drive arrangement. In this form of construction the only difference is that instead of the annular distance pieces 16, members 22 are provided on the extensions 7 integral with which are the roller holders 23 for tending to hold the chain 24 in contact with the ground; and of course wheels 25 having teeth thereon to engage the chain 24 must be substituted for the ordinary wheels 10.

From the above description it will be clearly seen that this axle arrangement can be applied to any vehicle having separate carrying and driving axles by merely securing extensions 7 to the outer ends of the carrying axles.

While in the foregoing the preferred embodiment of the invention has been described and shown, it is understood that the construction is susceptible to such changes as fall within the scope of the appended claims.

What I claim as my invention and desire to secure by Letters Patent is:

1. In an axle arrangement, the combination of a carrying axle terminating at its ends in flanges, solid circular extensions projecting outwardly from said flanges, distributing members pivotally mounted on said extensions, said members extending forwardly and rearwardly substantially at right angles to said carrying axle, non-rotatable axle pins secured to and extending outwardly from said members towards their extremities, bushings revolvably mounted on said axle pins, wheels secured to said bushings, means for holding said bushings on said axle pins, a driving axle supported over said carrying axle, and means for transmitting power from said driving axle to said wheels.

2. In an axle arrangement, the combination of a carrying axle terminating at its ends in flanges, solid circular extensions projecting outwardly from said flanges, a driving axle housing supported by said carrying axle, driving axle ends extending outwardly from the ends of said housing, distributing members pivotally mounted on said extensions and extending forwardly and rearwardly substantially at right angles to said carrying axle, non-rotatable axle pins secured to and extending outwardly from said members towards their extremities, sprockets mounted on said axle pins, other sprockets on said driving axle, chains between said first named sprockets and said other sprockets, bushings on said axle pins, said bushings being rotated by said first named sprockets, wheels secured to said bushings, and means for holding said first named sprockets in line with said other sprockets.

3. In an axle arrangement, the combination of a carrying axle terminating at its ends in flanges, solid circular extensions on said flanges, distributing members pivotally mounted on said extensions, said members extending forwardly and rearwardly substantially at right angles to said carrying axle, non-rotatable axle pins secured to and extending outwardly from said members towards their extremities, bushings revolvably mounted on said pins, wheels secured to said bushings, tie rods connecting each forward axle pin with its rear axle pin outside the wheels, and means for holding said tie rods on said axle pins, in combination with a driving axle housing supported by said carrying axle, driving axle ends extending outwardly from the ends of said housing, and means for rotating said bushings from said driving axle.

CHARLES M. EBEL.